May 16, 1933. J. A. ABREO 1,909,264
WHEEL SPREADER
Filed Dec. 28, 1931
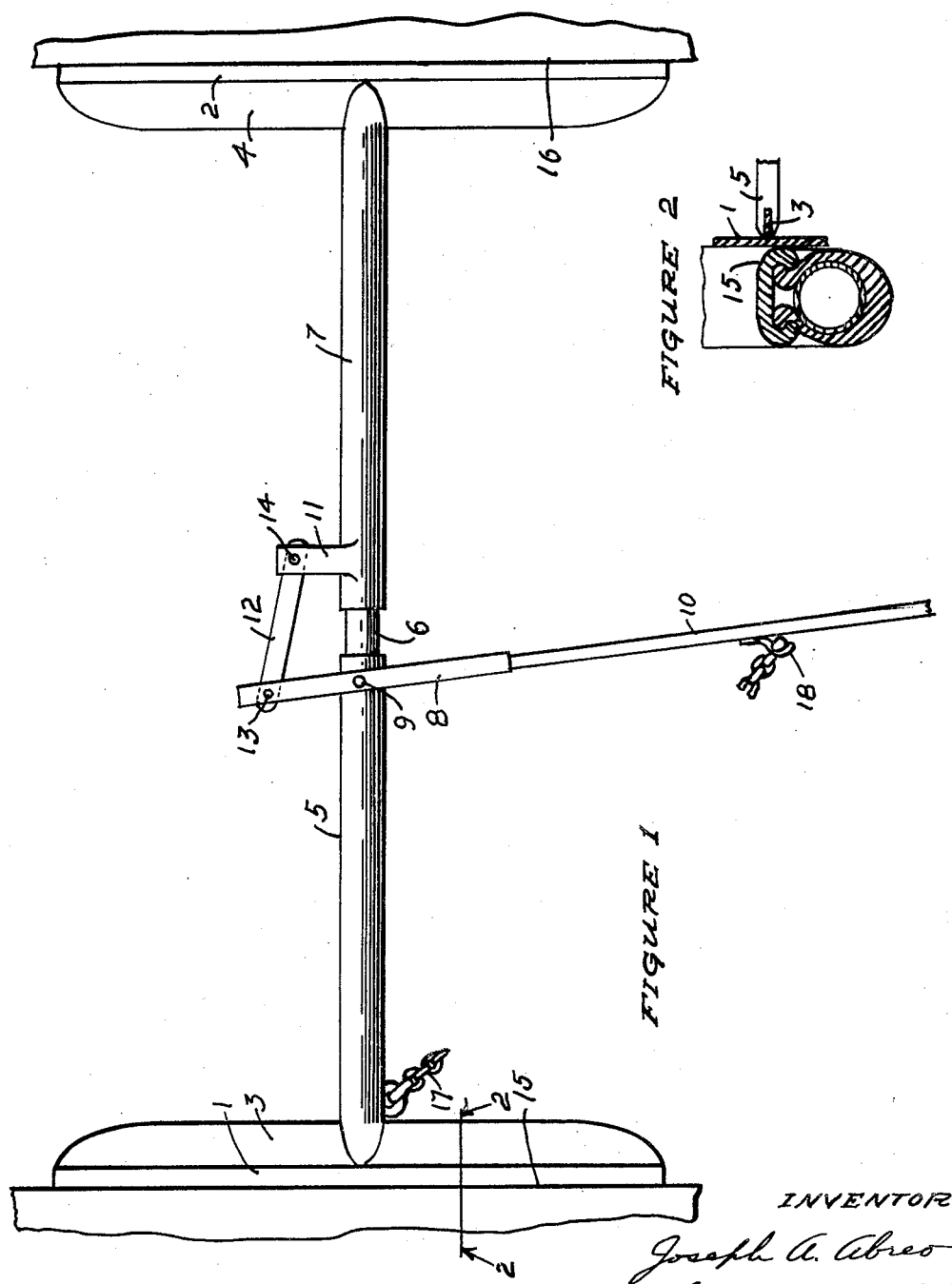

Patented May 16, 1933

1,909,264

UNITED STATES PATENT OFFICE

JOSEPH A. ABREO, OF SAN JOSE, CALIFORNIA

WHEEL SPREADER

Application filed December 28, 1931. Serial No. 583,460.

It is the object of the invention to provide means that may be inserted between the wheels on the opposite ends of an axle whereby pressure may be brought to bear against them at points remote from the axles, thereby permitting them to be easily tapped loose and removed from the said axle.

It is also an object of the invention to provide means of the character indicated that will be economical to manufacture, simple in form and construction, easily operated by a single person, strong, durable, and highly efficient in its practical application.

In the drawing:

Figure 1 is a plan view of a device embodying my invention, part broken away.

Figure 2 is a sectional view on line 2—2 of Figure 1.

The embodiment of the invention as herein disclosed comprises a pair of flat, straight bearing bars as 1 and 2 having ribs as 3 and 4 formed thereon for strength and rigidity.

The bar and rib 1—3 has a bar 5 mounted thereon as an integral part thereof, this bar extending at right angles to the plane of bar 1 at its central point, and having a portion of reduced diameter as 6 on the end remote from bar 1.

The bar and rib 2—4 has a tube 7 mounted thereon at right angles to the plane of bar 2 and at its central point, this tube forming a socket into which the part 6 fits and has sliding engagement therewith. When the two parts 6 and 7 are engaged the parts 5 and 7 are in axial alignment.

A lever 8 is pivotally mounted on bar 5 as shown at 9 and is provided with a handle 10 lying in the plane of the ribs 3—4. An arm 11 is mounted on the part 7, and a link 12 is pivotally mounted on lever 8 and arm 11 as shown at 13 and 14.

When the device is in use the bars 1 and 2 are placed against the inside edges of the rims 15 and 16 of the two wheels and the lever 8 actuated to force the two parts 5 and 7 in opposite directions through the medium of link 12. When the desired pressure is obtained the parts may be locked in position by hooking the chain 17 on bar 5 to the hook 18 on handle 10, whereupon the operator may quickly loosen and remove the wheels by tapping the same on the inside at any suitable point, preferably adjacent the axle upon which they are mounted.

It is to be understood, of course, that while I have herein shown and described but one specific embodiment of the invention, changes in form, construction, and method of assembly and operation may be made within the scope of the appended claim.

I claim:

As an article of manufacture, a wheel spreader for automobiles comprising a pair of spaced, parallel, flat, rim engaging members to span the wheel rims, longitudinally extending bracing ribs centrally located on the inner surfaces of said members, a bar rigidly affixed to the central portion of one of said members and extending inwardly thereof at right angles thereto, a reduced portion at the inner end of said bar, a tube having one end slidably mounted on said reduced portion and the other end rigidly affixed to said other rim engaging member at right angles thereto, an upstanding arm integrally carried by said tube adjacent its inner end, a link pivotally mounted on the free end of said arm, a lever pivotally mounted between its ends on said bar adjacent the inner end thereof and a pivotal connection between the pressure exerting end of the lever and the link, said connection acting to force said bar and tube slidingly apart upon movement of the power end of the lever in one direction.

JOSEPH A. ABREO.